US009041688B2

(12) United States Patent
Kiyose

(10) Patent No.: US 9,041,688 B2
(45) Date of Patent: May 26, 2015

(54) OPTICAL DETECTION SYSTEM AND PROGRAM

(75) Inventor: Kanechika Kiyose, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 311 days.

(21) Appl. No.: 13/276,541

(22) Filed: Oct. 19, 2011

(65) Prior Publication Data

US 2012/0120028 A1    May 17, 2012

(30) Foreign Application Priority Data

Nov. 11, 2010   (JP) .................................. 2010-252556

(51) Int. Cl.
   G06F 3/042   (2006.01)
   G06F 3/03    (2006.01)

(52) U.S. Cl.
   CPC ............ G06F 3/0428 (2013.01); G06F 3/0304 (2013.01)

(58) Field of Classification Search
   CPC ................. G06F 3/0425; G06F 3/042; G06F 2203/04101; G06F 3/03545; G06F 3/041; G06F 3/0421; G06F 3/0428; G06F 3/0304
   See application file for complete search history.

(56) References Cited

U.S. PATENT DOCUMENTS

| | | | | |
|---|---|---|---|---|
| 6,100,538 A * | 8/2000 | Ogawa | ...................... | 250/559.29 |
| 6,362,468 B1 * | 3/2002 | Murakami et al. | ............ | 250/221 |
| 6,441,362 B1 * | 8/2002 | Ogawa | .......................... | 250/221 |
| 6,512,507 B1 | 1/2003 | Furihata et al. | | |
| 6,927,384 B2 * | 8/2005 | Reime et al. | ................... | 250/221 |
| 6,953,926 B2 | 10/2005 | Reime | | |
| 7,552,402 B2 * | 6/2009 | Bilow | ........................... | 715/862 |
| 7,969,426 B2 * | 6/2011 | Skillman et al. | ............... | 345/175 |
| 8,456,447 B2 * | 6/2013 | Newton | ........................ | 345/175 |
| 8,508,508 B2 * | 8/2013 | Newton | ........................ | 345/175 |
| 2002/0015159 A1 * | 2/2002 | Hashimoto | .................... | 356/620 |
| 2003/0034439 A1 * | 2/2003 | Reime et al. | .................. | 250/221 |
| 2004/0004601 A1 * | 1/2004 | Wu | ................................ | 345/157 |
| 2005/0057524 A1 * | 3/2005 | Hill et al. | ....................... | 345/173 |
| 2006/0132459 A1 * | 6/2006 | Huddleston et al. | .......... | 345/173 |
| 2006/0221063 A1 * | 10/2006 | Ishihara | ........................ | 345/173 |
| 2009/0091553 A1 * | 4/2009 | Keam et al. | .................... | 345/175 |
| 2009/0303176 A1 * | 12/2009 | Chen et al. | ..................... | 345/156 |
| 2010/0050133 A1 * | 2/2010 | Nishihara et al. | .............. | 715/863 |
| 2010/0085330 A1 * | 4/2010 | Newton | ........................ | 345/175 |
| 2010/0134447 A1 * | 6/2010 | Nakajoh | ........................ | 345/175 |
| 2010/0245289 A1 * | 9/2010 | Svajda | .......................... | 345/175 |
| 2011/0141486 A1 * | 6/2011 | Wada et al. | .................... | 356/614 |
| 2011/0291988 A1 * | 12/2011 | Bamji et al. | ................... | 345/175 |
| 2012/0068941 A1 * | 3/2012 | Arrasvuori et al. | ........... | 345/173 |
| 2012/0113436 A1 | 5/2012 | Kiyose | | |

FOREIGN PATENT DOCUMENTS

| | | | | |
|---|---|---|---|---|
| GB | 2350674 A | * 12/2000 | ................ | G06F 3/00 |
| JP | 04-192019 B2 | 7/1992 | | |
| JP | 11-345085 | 12/1999 | | |

(Continued)

*Primary Examiner* — Viet Pham
*Assistant Examiner* — Ivelisse Martinez Quiles
(74) *Attorney, Agent, or Firm* — Harness, Dickey & Pierce, P.L.C.

(57) ABSTRACT

An optical detection system includes a detection part that detects object information as information of an object based on a light reception result of reflected light by reflection of irradiation light on the object, and a processing part that performs processing based on the object information, and the processing part acquires reflectance information of the object as the object information and performs processing of a command designated by the object based on the acquired reflectance information.

12 Claims, 14 Drawing Sheets

(56) References Cited

FOREIGN PATENT DOCUMENTS

| | | | |
|---|---|---|---|
| JP | 2000-112651 A | 4/2000 | |
| JP | 2001-142643 | 5/2001 | |
| JP | 2001-228971 A | 8/2001 | |
| JP | 2008-234277 A | 10/2008 | |
| JP | 2009-008537 | 1/2009 | |
| JP | 2010146386 A | * | 7/2010 |

* cited by examiner

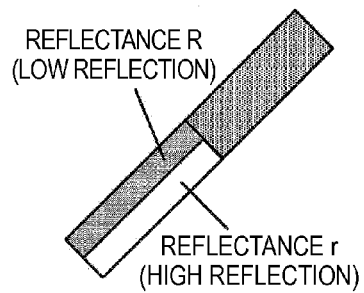 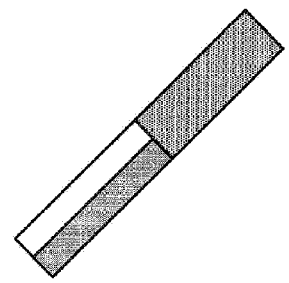
FIG. 7A   FIG. 7B
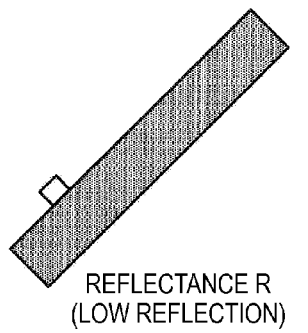 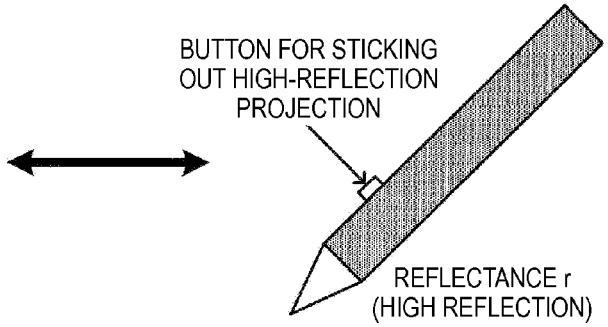
FIG. 8A   FIG. 8B
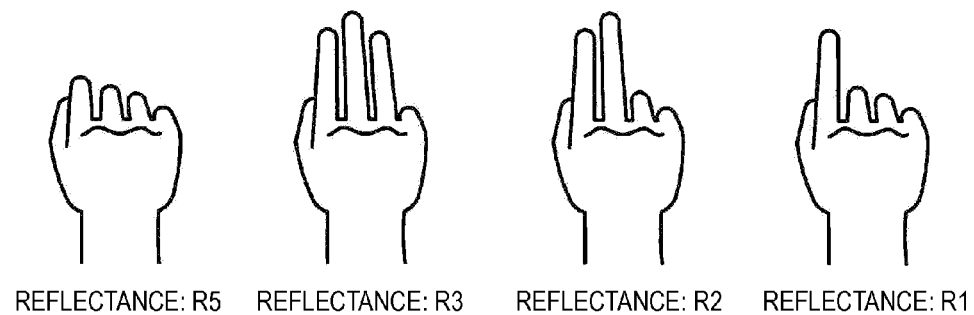
FIG. 9

OPTICAL DETECTION SYSTEM AND PROGRAM

BACKGROUND

1. Technical Field

The present invention relates to an optical detection system, a program, etc.

2. Related Art

In electronic equipment such as a cellular phone, a personal computer, a car navigation system, a ticket vending machine, and a baking terminal, a display device with position detection function having a touch panel on the front surface of a display unit has been recently used. According to the display device, a user can point an icon of a displayed image or the like and input information while referring to images displayed on the display unit. As a position detection method using the touch panel, for example, a resistance-film method, a capacitance method, or the like is known.

On the other hand, in a projection display device (projector) and a display device for digital signage, their display areas are larger compared to those of the display devices of the cellular phone and the personal computer. Therefore, in these display devices, it is difficult to realize position detection using the above described touch panels according to the resistance-film method and the capacitance method.

As related art technologies of position detectors for projection display device, for example, the technologies disclosed in Patent Documents 1, 2 (JP-A-11-345085, JP-A-2001-142643) are known. However, in these position detector, it may be possible to detect the position of an object (user's finger, a pen-shaped device, or the like), but difficult to determine an input start (input designation command) and an input end (end designation command). Here, the input is executed in response to the position of the object. For example, in a character input system, the input start corresponds to the start of line drawing from the position of the object and the input end corresponds to the end of line drawing in the position of the object.

In the case where the determination of the input start and the input end is difficult, for example, in the case where character input is performed, it may be impossible to determine the point of starting character input (that is, it may be impossible to start writing characters), and it may be impossible to determine the end of character input (that is, all characters may be unicursal).

SUMMARY

An advantage of some aspects of the invention is to provide an optical detection system, a program, etc. that can detect position information of an object and select and execute a predetermined command of plural commands based on reflectance information of the object.

Another advantage of some aspects of the invention is to provide an optical detection system, a program, etc. that can detect position information of an object and determine input start (input designation command) and input end (end designation command) based on reflectance information of the object.

An aspect of the invention relates to an optical detection system including a detection part that detects object information as information of an object based on a light reception result of reflected light by reflection of irradiation light on the object, and a processing part that performs processing based on the object information, wherein the processing part acquires reflectance information of the object as the object information and performs processing of a command designated by the object based on the acquired reflectance information.

According to the aspect of the invention, the optical detection system may perform processing of the command designated by the object based on the reflectance information of the object. Accordingly, processing of the command in response to the reflectance or the like can be performed by changing the reflectance of the object.

Further, according to the aspect of the invention, the processing part may perform determination processing of a kind of the command based on a change in reflectance represented by the reflectance information.

Thereby, the determination processing of the kind of the command can be performed based on the change in reflectance, and an appropriate command of plural commands may be executed by appropriately changing the reflectance.

Furthermore, according to the aspect of the invention, the processing part may perform determination of an input designation command and an end designation command based on the change in reflectance represented by the reflectance information.

Thereby, the determination of the input designation command and the end designation command can be performed based on the change in reflectance.

In addition, according to the aspect of the invention, the input designation command may be a command to designate an input start of shape input by the object, the end designation command may be a command to designate an input end of shape input by the object, if the reflectance represented by the reflectance information of the object is a first reflectance, the processing part may determine that the input start of the shape input has been designated by the input designation command, and, if the reflectance represented by the reflectance information is a second reflectance different from the first reflectance, the processing part may determine that the input end of the shape input has been designated by the end designation command.

Thereby, in a shape input system, whether the start of shape input or the end of shape input has been designated can be determined and shape input or the like may be appropriately performed.

Further, according to the aspect of the invention, the processing part may perform determination of a designation command to designate an execution target command and an execution command to execute the execution target command designated by the designation command based on the change in reflectance represented by the reflectance information.

Thereby, the determination of the designation command and the execution command can be performed based on the change in reflectance.

Furthermore, according to the aspect of the invention, if the reflectance represented by the reflectance information of the object is a first reflectance, the processing part may determine that the execution target command has been designated by the designation command, and then, if the reflectance represented by the reflectance information is a second reflectance different from the first reflectance, the processing part may execute the execution target command designated by the designation command by the execution command.

Thereby, which of designation and execution of the execution target command has been performed can be determined. Accordingly, in an application such as a filer, for example, designation and execution of the execution target command or the like can be performed by performing selection (designation) of an icon and execution of an icon.

In addition, according to the aspect of the invention, the object may be a user's finger, and the processing part may perform processing of the command based on the change of the reflectance information due to a difference in the number of fingers existing in a detection region.

Thereby, the processing of the command or the like can be performed using the user's finger.

Further, according to the aspect of the invention, the object may be a pen-shaped object, the pen-shaped object may have a first reflection surface with a first reflectance and a second reflection surface with a second reflectance higher than the first reflectance, and the processing part may acquire first reflectance information acquired from a light reception result of reflected light from the first reflection surface and second reflectance information acquired from a light reception result of reflected light from the second reflection surface, and may perform processing of the command based on the first reflectance information and the second reflectance information.

Thereby, the processing of the command or the like can be performed using the pen-shaped object.

Furthermore, according to the aspect of the invention, the object may be a pen-shaped object, the pen-shaped object may be an object having a projection part including a member having a reflectance different from that of a main body part in a state of the projection part switched between a retracted state and a non-retracted state by a predetermined operation, and the processing part may acquire first reflectance information acquired from a light reception result of reflected light by the pen-shaped object when the projection part is in the retracted state and second reflectance information acquired from a light reception result of reflected light by the pen-shaped object when the projection part is in the non-retracted state, and may perform processing of the command based on the first reflection information and the second reflection information.

Thereby, the processing of the command or the like can be performed using the pen-shaped object.

In addition, according to the aspect of the invention, the processing part may perform command processing of at least one of command determination and command execution using X-coordinate information and Y-coordinate information of the object if a Z-coordinate range of the object from a target surface is detected to be a first Z-coordinate range near the target surface, and the processing part may perform hovering processing as processing for hovering operation using X-coordinate information and Y-coordinate information of the object if the Z-coordinate range of the object from the target surface is detected to be a second Z-coordinate range farther than the first Z-coordinate range.

Thereby, the command processing and the hovering processing can be appropriately switched based on the Z-coordinate range.

Further, according to the aspect of the invention, the processing part may perform determination processing of a kind of the command based on the reflectance information when the object is in the first Z-coordinate range.

Thereby, the determination processing of the kind of the command may be performed using the reflectance information in the first Z-coordinate range.

Furthermore, according to the aspect of the invention, the processing part may perform calibration processing on the reflectance information when the object is in the first Z-coordinate range.

Thereby, the calibration may be performed using the reflectance information in the first Z-coordinate range, and thus, errors in the system, differences among individuals of users, etc. can be absorbed.

In addition, according to the aspect of the invention, the system may further include an irradiation part that outputs irradiation light to a detection region, and a light receiving part that receives the reflected light.

Thereby, the optical detection system can include elements envisioned to be realized as hardware like the irradiation part and the light receiving part.

Another aspect of the invention relates to a program allowing a computer to function as a detection part that detects object information as information of an object based on a light reception result of reflected light by reflection of irradiation light on the object, and a processing part that performs processing based on the object information, wherein the processing part acquires reflectance information of the object as the object information and performs processing of a command designated by the object based on the acquired reflectance information.

BRIEF DESCRIPTION OF THE DRAWINGS

The invention will be described with reference to the accompanying drawings, wherein like numbers reference like elements.

FIG. 7A and FIG. 7B show an example of a pen-shaped object having members with plural reflectances.

FIG. 8A and FIG. 8B show another example of the pen-shaped object having members with plural reflectances.

FIG. 9 is a diagram for explanation of differences in reflectance due to differences in number of fingers.

DESCRIPTION OF EXEMPLARY EMBODIMENTS

As below, preferred embodiments of the invention will be explained in detail. Note that the embodiments explained as below do not unduly limit the invention described in the appended Claims, but all of configurations explained in the embodiments are not essential as solving means of the invention.

1. Configuration Example of Optical Detection System

Figure 1B:
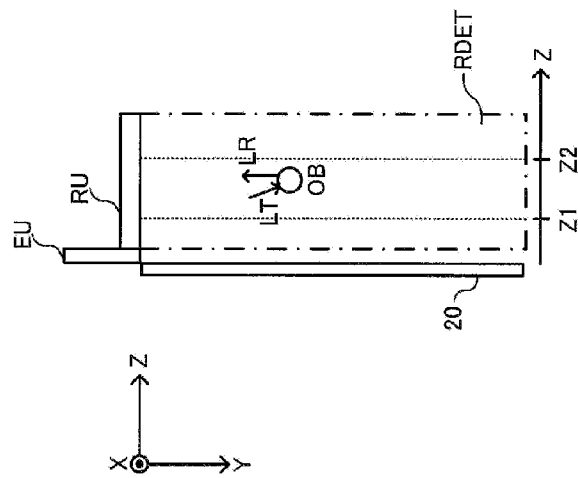
FIG. 1A and FIG. 1B show a configuration example of an optical detection system of the embodiment.
Figure 1A:
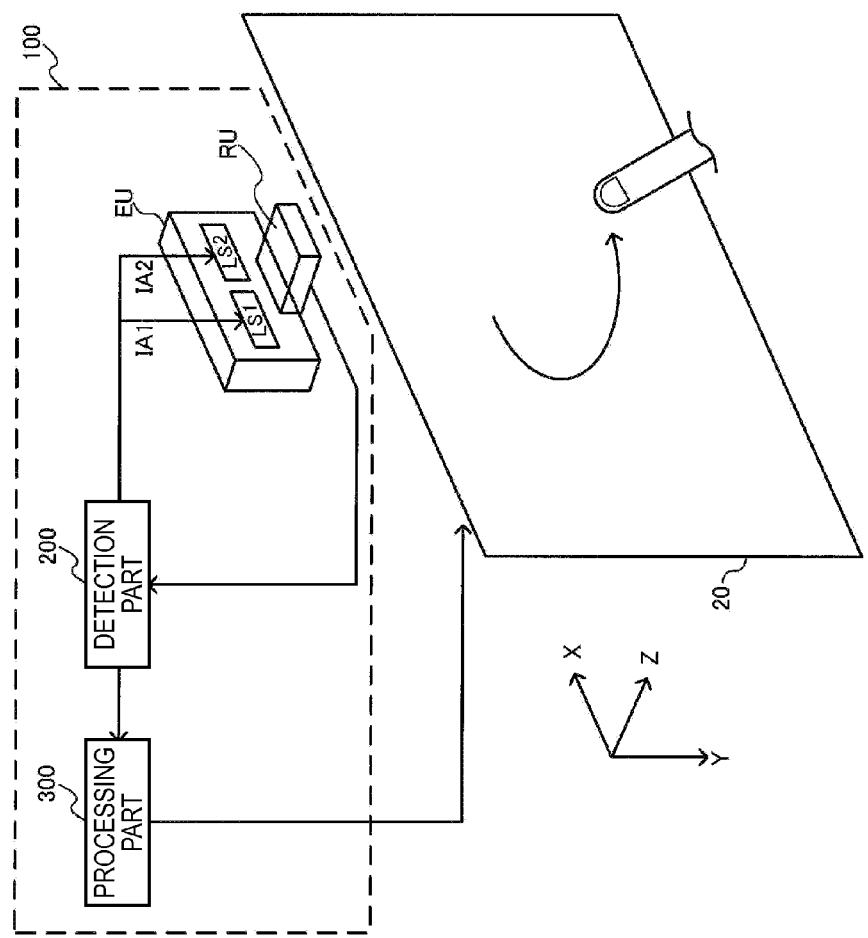

FIG. 1A shows a basic configuration example of an optical detection system of the embodiment realized by an optical detector 100 etc. The optical detector 100 in FIG. 1A includes a detection part 200, a processing part 300, an irradiation part EU, and a light receiving part RU. FIG. 1B is a diagram for explanation of detection of Z-coordinate information by the optical detection system of the embodiment. Note that the optical detection system of the embodiment is not limited to the configuration in FIG. 1A and FIG. 1B, but various modifications may be made by omitting part of its component element, replacing it by another component element, or adding another component element.

The optical detection system is not limited to the form realized as the above described optical detector 100 including the detection part 200 and the processing part 300. The functions of the detection part 200 and the processing part 300 may be realized by an information processing unit (for example, a PC or the like), and the irradiation part EU, the light receiving part RU, and the information processing unit may operate in conjunction with one another, and thereby, the optical detection system may be realized.

The detection part 200 detects object information (for example, coordinate information or reflectance information) of the object OB based on a light reception result of reflected light LR by reflection of irradiation light LT on the object OB. Specifically, for example, as shown in FIG. 1B, when a detection area RDET as an area in which the object OB is detected is an area along the X-Y plane, the detection part 200 detects at least Z-coordinate information as coordinate information in the Z-direction. The detection part 200 may further detect X-coordinate information and Y-coordinate information of the object OB existing in the detection area RDET. The detection method of the coordinate information by the detection part 200 will be explained later. Further, specifically, the detection part 200 detects reflectance information as information on the reflectance of the object OB.

The detection area RDET refers to an area (region) where the object OB is detected, and specifically, an area where the reflected light LR by reflection of irradiation light LT on the object OB is received by the light receiving part RU, and thereby, the object OB may be detected. More specifically, the area is where the reflected light LR is received by the light receiving part RU and the object OB can be detected and accuracy in the acceptable range may be ensured with respect to the detection accuracy.

The processing part 300 performs various processing based on the object information detected by the detection part 200. Particularly, processing of commands designated by the object is performed based on the reflectance information of the object OB. Specifically, processing of determining the kinds of plural commands (for example, the input designation command and the end designation command) is performed. The details of command determination will be described later.

The irradiation part EU outputs irradiation light LT to the detection area RDET. As will be described later, the irradiation part EU includes a light source part including light emitting devices such as LEDs (light emitting diodes) and outputs infrared rays (near infrared rays near the visible light range), for example, by the emission of the light source part.

The light receiving part RU receives reflected light LR by reflection of irradiation light LT on the object OB. The light receiving part RU may include plural light receiving units PD. For the light receiving units PD, for example, photodiodes, phototransistors, or the like may be used.

Figure 2:
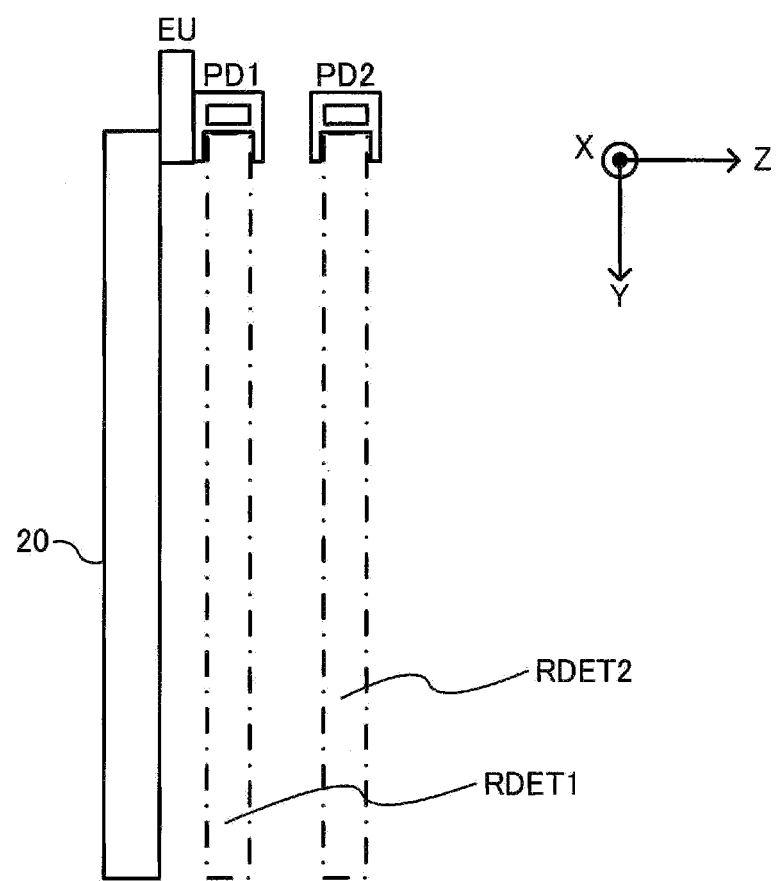
FIG. 2 shows a configuration example of a light receiving part.

FIG. 2 shows a specific configuration example of the light receiving part RU of the embodiment. In the configuration example of FIG. 2, the light receiving part RU includes two light receiving units PD1, PD2 and the light receiving units PD1, PD2 are provided in positions at different heights in the Z-direction. In the two light receiving units PD1, PD2, slits or the like (incident light limitation parts) for limiting an angle at which incident light enters (an angle on the Y-Z plane) are provided, and they receive reflected lights LR from objects OB existing in detection areas RDET1, RDET2, respectively. For example, the light receiving unit PD1 receives the reflected light LR from the object OB existing in the detection area RDET1, but does not receive the reflected light LR from the object OB existing in the detection area RDET2. The detection part 200 detects Z-coordinate information based on the respective light reception results of the plural light receiving units PD1, PD2. Note that the irradiation unit EU outputs irradiation light LT to the two detection areas RDET1, RDET2. Further, the respective detection areas RDET1, RDET2 are areas along the X-Y plane.

In this manner, which detection area of the two detection areas RDET1, RDET2 where the object OB exists may be detected, and the Z-coordinate information of the object OB may be detected.

Note that the configuration example of FIG. 2 includes the two light receiving units, however, may include three or more light receiving units. Further, as will be described later, the irradiation part EU outputs irradiation light LT and the respective light receiving units PD1, PD2 receive the reflected lights LR from the objects OB, and thereby, X-coordinate information and Y-coordinate information of the objects OB may be detected.

Figure 3:
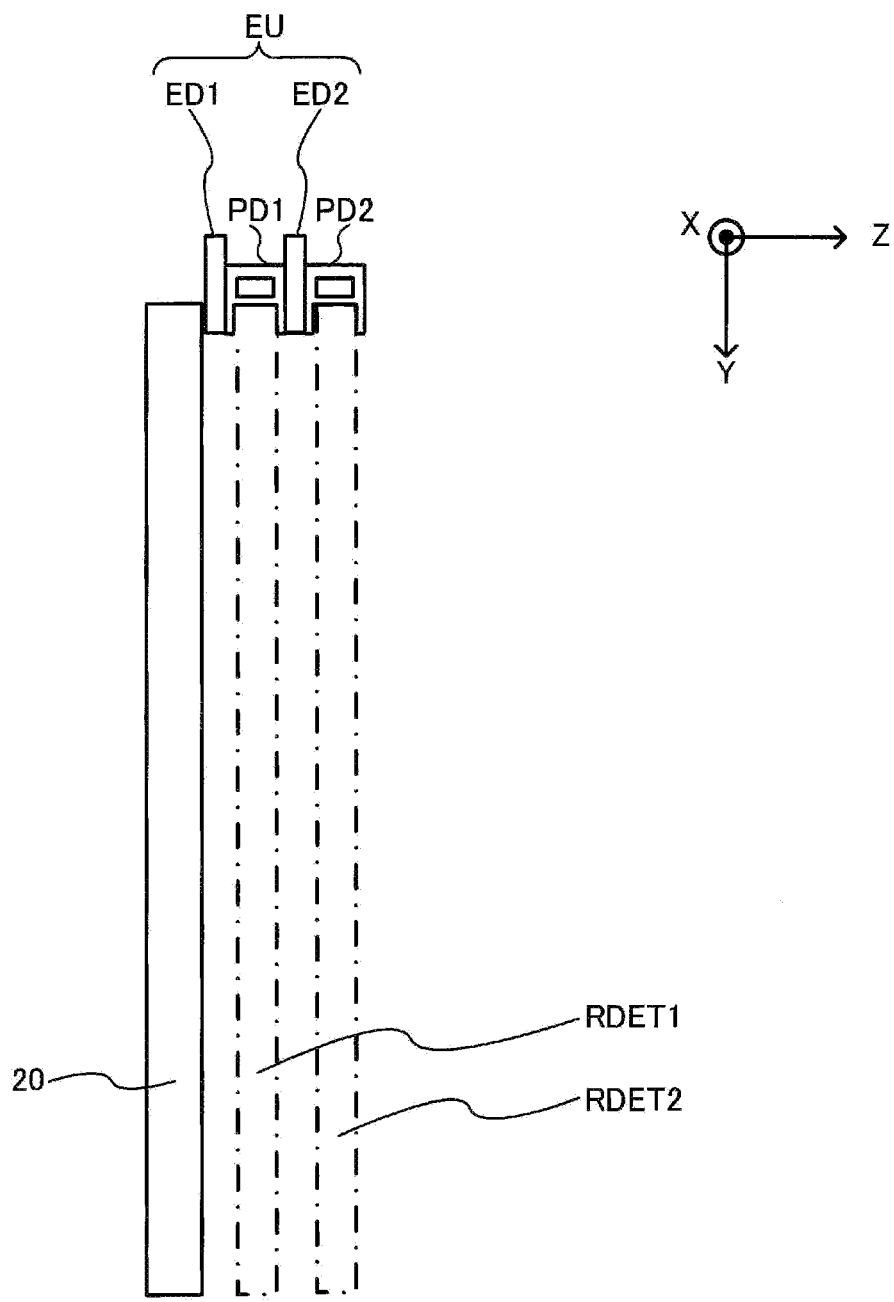
FIG. 3 shows another configuration example of the light receiving part.

FIG. 3 shows a modified example of the light receiving part RU of the embodiment. In the modified example of FIG. 3, the irradiation part EU includes two irradiation units ED1, ED2. The irradiation units ED1, ED2 output irradiation lights LT to corresponding detection areas RDET1, RDET2, respectively. For example, when an object OB exists in the detection area RDET1, the irradiation light from the irradiation unit ED1 is reflected by the object OB and the reflected light is received by the light receiving unit PD1.

In this manner, which detection area of the two detection areas RDET1, RDET2 where the object OB exists may be detected, and the Z-coordinate information of the object OB can be detected. Further, by providing one irradiation unit for one detection area, the detection accuracy of the Z-coordinate information may be improved.

Figure 4A:
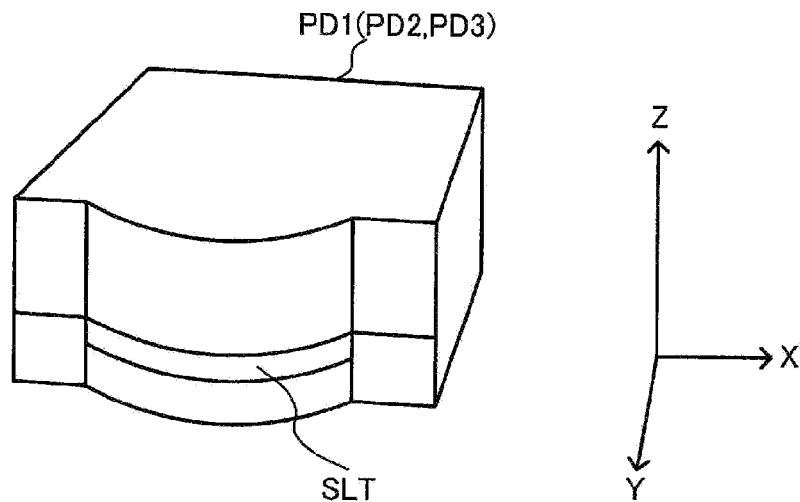
FIG. 4A and FIG. 4B show a configuration example of a light receiving unit.
Figure 4B:
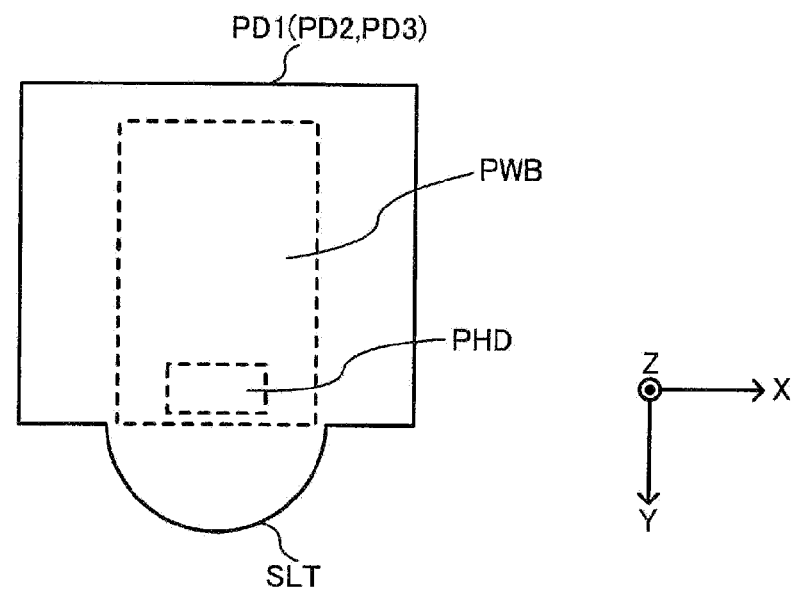

FIG. 4A and FIG. 4B show a configuration example of the light receiving units PD1, PD2 having slits SLT (incident light limitation parts). As shown in FIG. 4A, the slit SLT is provided on the front surface of a light receiving device PHD for limiting entering incident light. The slit SLT is provided along the X-Y plane and may limit the angle in the Z-direction at which incident light enters. That is, the light receiving units PD1, PD2 may receive incident lights entering at predetermined angles defined by the slit widths of the slits SLT.

FIG. 4B is a plan view of the light receiving unit having the slit SLT seen from above. For example, a printed wiring board PWB is provided within a casing of aluminum or the like, and the light receiving device PHD is mounted on the printed wiring board PWB.

Figure 5:
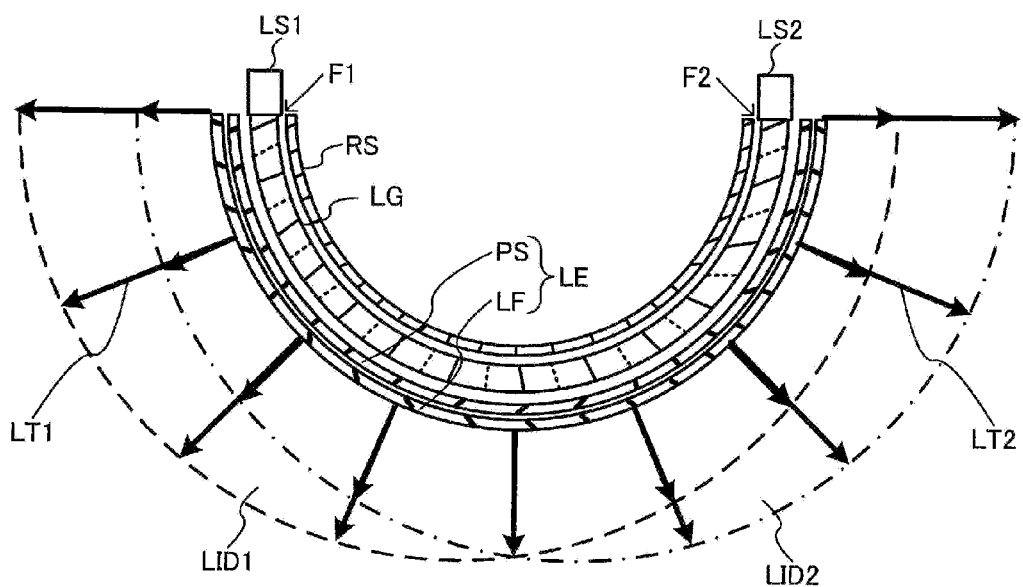
FIG. 5 shows a configuration example of an irradiation part.

FIG. 5 shows a detailed configuration example of the irradiation part EU of the embodiment. The irradiation part EU of the configuration example in FIG. 5 includes light sources LS1, LS2, a light guide LG, and an irradiation direction setting part LE. Further, the irradiation part EU includes a reflection sheet RS. Furthermore, the irradiation direction setting part LE includes an optical sheet PS and a louver film LF. Note that the irradiation part EU of the embodiment is not limited to the configuration in FIG. 5, but various modifications may be made by omitting part of its component element, replacing it by another component element, or adding another component element.

The light sources LS1, LS2 output light source lights and have light emitting devices such as LEDs (light emitting diodes). The light sources LS1, LS2 output light source lights of infrared lights (near infrared rays near the visible light range), for example. That is, it is desirable that the light source lights emitted by the light sources LS1, LS2 are lights in a wavelength range efficiently reflected by an object such as a user's finger and a touch pen, or lights in a wavelength range not much contained in environment light to be external perturbation light. Specifically, infrared light having a wavelength around 850 nm as light in a wavelength range with higher reflectance on the surface of a human body or infrared light having a wavelength around 950 nm as light in a wavelength range not much contained in environment light may be emitted.

The light source LS1 is provided on one end of the light guide LG as shown by F1 in FIG. 5. Further, the second light source LS2 is provided on the other end of the light guide LG as shown by F2. The light source LS1 outputs light source light to a light incident surface on the one end (F1) of the light guide LG to output irradiation light LT1, and forms (sets) a first irradiation light intensity distribution LID1 in a detection area of an object. On the other hand, the light source LS2 outputs the second light source light to a light incident surface on the other end (F2) of the light guide LG to output the second irradiation light LT2, and forms a second irradiation light intensity distribution LID2 different in intensity distribution from the first irradiation light intensity distribution LID1 in the detection area. In this manner, the irradiation part EU may output irradiation lights different in intensity distribution in response to the position in the detection area RDET.

The light guide LG (light guide member) guides light source lights emitted by the light sources LS1, LS2. For example, the light guide LG guides light source lights from the light sources LS1, LS2 along a curved light guide path and has a curved shape. Specifically, the light guide LG has an arc shape in FIG. 5. Note that the light guide LG has an arc shape with a center angle of 180 degrees in FIG. 5, however, an arc shape having a center angle smaller than 180 degrees may be used. The light guide LG is formed using a transparent resin member of acrylic resin, polycarbonate, or the like, for example.

At least one of the outer peripheral side and the inner peripheral side of the light guide LG is worked for adjustment of light output efficiency of the light source light from the light guide LG. As a working method, for example, various methods such as a serigraph method of printing reflection dots, a molding method of forming concavities and convexities by stamper or injection, or a grooving method may be employed.

The irradiation direction setting part LE realized by the prism sheet PS and the louver film LF is provided at the outer peripheral side of the light guide LG, and receives the light source light output from the outer peripheral side (outer peripheral surface) of the light guide LG. Further, irradiation lights LT1, LT2 for which irradiation directions are set from the inner peripheral side toward the outer peripheral side of the light guide LG having the curved shape (arc shape) are output. That is, the direction of the light source light output from the outer peripheral side of the light guide LG is set (regulated) to the irradiation direction along the normal direction (radial direction) of the light guide LG, for example. Thereby, the irradiation lights LT1, LT2 are radially output in the direction from the inner peripheral side toward the outer peripheral side of the light guide LG.

The setting of the irradiation direction of the irradiation lights LT1, LT2 is realized by the prism sheet PS and the louver film LF of the irradiation direction setting part LE. For example, the prism sheet PS sets the direction of the light source light output at a low visual angle from the outer peripheral side of the light guide LG by raising it toward the normal direction side so that the peak of the light output characteristic may be in the normal direction. Further, the louver film LF blocks (cuts) the light in directions other than the normal direction (low visual angle lights).

As described above, according to the irradiation part EU of the embodiment, the light sources LS1, LS2 are provided on both ends of the light guide LG and the light sources LS1, LS2 are alternately turned on, and thereby, two irradiation light intensity distributions may be formed. That is, the irradiation light intensity distribution LID1 in which intensity on one end of the light guide LG is higher and the irradiation light intensity distribution LID2 in which intensity on the other end of the light guide LG is higher may be alternately formed.

By forming the irradiation light intensity distributions LID1, LID2 and receiving reflected lights of the irradiation lights having these intensity distributions by the objects, object detection with minimized influence of external perturbation light such as environment light and higher accuracy may be performed. That is, it may be possible to cancel out infrared components contained in the external perturbation light, and minimize the adverse effect by the infrared components on the detection of the object.

2. Processing of Commands Based on Reflectance Information of Object

Next, a processing method of commands designated by an object in the processing part 300 will be explained. Here, processing of commands specifically refers to a determination method of the kinds of commands, for example, (more specifically, determination between the input designation command and the end designation command, for example) or the like. Note that the command processing is not limited to the determination of the kinds of commands as long as the processing of commands based on the reflectance of the object and designated by the object is performed.

In the optical detection system described in the previous section, information for position detection of the object (specifically, for example, information of control current, which will be described later in the following section or the like) can be detected. Accordingly, on the basis of the information for position detection, position information of the object may be acquired as two-dimensional coordinates of (X,Y) or the like, for example. However, when a specific application is to be executed, it is necessary to appropriately determine commands.

For example, in a character input application, a command corresponds to a drawing command (drawing characters in positions on a screen corresponding to positions actually traced using an object). More specifically, for example, commands include an input designation command and an end designation command. The input designation command is a command to start character drawing from the position of the object and the end designation command is a command to end character drawing at the position of the object. It may be impossible to perform character drawing unless determination of the two commands is appropriately performed.

Unless the input designation command is given, only the current drawing target position may be grasped but it may be impossible to draw any characters. Further, unless the end designation command is determined, the drawing command is constantly executed and characters are continuously drawn in a unicursal manner, and it may be impossible to represent spaces between characters or spaces in the character.

Further, it is conceivable that the end designation command is given by leaving the object from the sensing range of the position detection system, however, in this case, a problem that it is difficult to smoothly leave the object from the sensing range arises. In the optical detection system according to the embodiment, unlike the touch panel, the sensing area spreads over not only the target surface but the space near the target surface. Since infrared light or the like is typically used for sensing, the sensing range is invisible for the user. It is very difficult to smoothly move the object into or out of the invisible region, and it is necessary to largely separate the object from the target surface for reliably performing the end designation command. However, in the character drawing system or the like, it is assumed that the determination of commands is frequently performed at a high speed, and, if there is a need to largely move the object at each time, a problem of convenience for the user or the like arises. Therefore, it is desirable that the determination of commands is performed by a method other than leaving of the object from the sensing range.

Furthermore, for example, the commands may include a designation command to designate an execution target command and an execution command to execute the execution target command designated by the designation command. Here, in an application of selecting and executing icons on the screen, for example, (e.g., a filer or the like), the designation command and the execution command correspond to an icon selection command and an icon execution command. More specifically, for example, assuming that the commands are used as an alternative to mouse operation, commands such as hovering (cursor movement), a selection command (left click), an execution command (double click), and a property display command (right click) are considered. To appropriately select and execute an icon intended by the user, determination of the commands is also necessary. Note that the designation command and the execution command are not limited to the icon selection command and the icon execution command, but may be other commands if there is an execution target command as long as they are commands to designate and execute an execution target command. For example, the execution target command may be associated with anything other than the icons.

However, it has been difficult to determine commands by simply acquiring the two-dimensional coordinates (or three-dimensional coordinates) of the object. Accordingly, the applicant suggests a method of detecting reflectance of an object using an appropriate method and changing the reflectance of the object, and determining commands based on reflectance information of the object.

As below, in the first embodiment, a method using a user's finger as an object will be explained, and, in the second embodiment, a method using a pen-shaped object as an object will be explained. Further, in the first and second embodiments, an object having two reflectances will be explained, and, in the third and fourth embodiments, the case where an object has three or more reflectances will be explained. In the third embodiment, an example of application to a character input system will be explained, and, in the fourth embodiment, an example of application to a selection and execution system of icons such as a filer will be explained.

2.1 First Embodiment

First, an example using a user's finger as an object will be explained. In the embodiment, the object has only two reflectances.

Figure 6A:
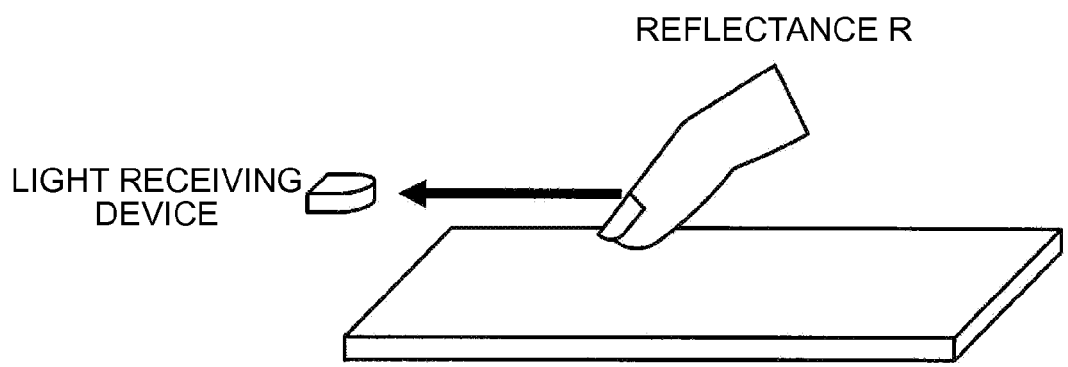
FIG. 6A and FIG. 6B are explanatory diagrams of examples of changing reflectance of an object by changing the number of fingers.
Figure 6B:
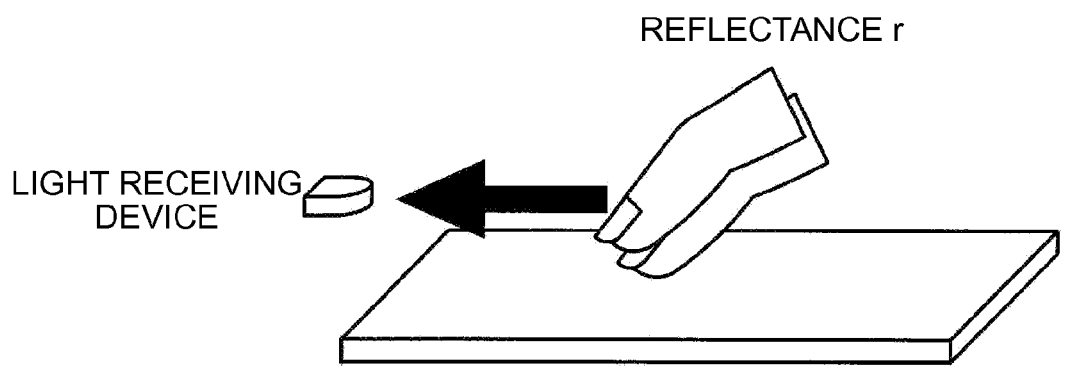

As shown in FIG. 6A and FIG. 6B, the reflectance of the object is changed depending on whether sticking one finger or two fingers out. The amount of reflected light is larger for the two fingers than for the one finger. That is, given that the reflectance for one finger as shown in FIG. 6A is R the reflectance for two fingers as shown in FIG. 6B is r, r>R holds. That is, by setting execution of the first command when the reflectance is R and execution of the second command when the reflectance is r, the first command and the second command can be determined in response to the reflectance of the object.

Specifically, for example, in the character drawing system, the first command may be used as the input designation command and the second command may be used as the end designation command. That is, character drawing is performed when one finger is used, and the character drawing is ended when two fingers are used.

In this case, for example, character input is performed using only one index finger, and the character input is ended by adding the middle finger to the index finger after drawing is finished. Further, it is only necessary to move the index finger with the middle finger into the sensing range at the start of drawing. At this time, the end designation command is executed and character drawing is not performed. Then, the finger is moved with the middle finger to the position where character drawing is desired to start, the middle finger is flexed when moved to the desired position, and character drawing is started with only one index finger.

Note that the fingers and the number of fingers for use are arbitrary as long as a difference between the two reflectances is obtained. However, for associating reflectances with commands in the system, for recognition of the lower reflection and the higher reflection, it is desirable to execute calibration at start-up. It is necessary to associate which command is performed with which reflectance because the reflectance is different depending on which finger is used, for example. Further, the reflectance may be largely different even using the same fingers between an adult user and a child user. It is necessary to absorb such a difference by calibration.

In the above described embodiment, the optical detection system includes the detection part 200 that detects object information based on the light reception result of the reflected light by the reflection of the irradiation light on the object and the processing part 300 that performs processing based on the object information as shown in FIG. 1A, and the processing part 300 acquires reflectance information of the object as the object information and performs processing of commands designated by the object based on the acquired reflectance information.

Here, the reflectance information refers to information representing the reflectance of the object when irradiated with the irradiation light, and may be the reflectance itself or other information equal to the reflectance. For example, in the above described configuration of the light receiving part RU of the embodiment, photodiodes or the like are used as the light receiving units. Accordingly, the amount of reflected light (corresponding to the reflectance) is acquired as a current value in the detection part 200. Thus, information of the current value may be used as the reflectance information.

Thereby, in the optical detection system including the above described detection part 200 and the processing part 300, processing of commands designated by the object can be performed based on the reflectance information of the object as a target of position detection. That is, using the objects having different reflectances, plural commands corresponding to the respective reflectances can be used depending on the purposes.

Further, the processing part 300 may perform determination processing of the kinds of commands based on changes in reflectance represented by the reflectance information.

Thereby, using objects having different reflectances, determination processing as to which command of the different kinds of plural commands is executed can be performed. That is, by appropriately associating the reflectances of the object with the kinds of commands, plural commands can be used according to the user's intension.

Furthermore, the processing part 300 may perform determination of the input designation command and the end designation command based on the change in reflectance represented by the reflectance information. Specifically, the input designation command is a command to designate input start of shape input by an object, and the end designation command is a command to designate input end of the shape input by the object. If the reflectance of the object is the first reflectance, the processing part 300 determines that the input start of the shape input has been designated by the input designation command, and, if the reflectance of the object is the second reflectance different from the first reflectance, the processing part 300 determines that the input end of the shape input has been designated by the end designation command.

Thereby, in the above described shape input system (character input system), the input start and the input end of the shape may be designated by changing the reflectance of the object, and shape input can be appropriately performed.

In addition, the object may be a user's finger. The processing part 300 may perform processing of commands based on the change in reflectance information depending on the number of fingers existing in a detection region (sensing region).

Thereby, a user's finger can be used as an object. As shown in FIGS. 6A and 6B, the amount of reflected light detected by the detection part 200 may be changed depending on sticking one finger or two fingers out. That is, the reflectance of the object may be changed by changing the number of fingers, and the reflectance of the object can be changed by a simple method for the user.

Further, the optical detection system may include the irradiation part EU that outputs irradiation light to the detection region and the light receiving part RU that receives the reflected light in addition to the detection part 200 and the processing part 300 as shown in FIG. 1A.

Thereby, the configuration including the irradiation part EU and the light receiving part RU, which has shown as the optical detector 100 in FIG. 1A, can be used as an optical detection system. That is, the optical detection system in the embodiment may include elements envisioned to be configured as hardware like the irradiation part EU and the light receiving part RU.

Further, the embodiment relates to a program that allows a computer to function as the detection part 200 and the processing part 300. The detection part 200 detects object information based on the light reception result of the reflected light by the reflection of the irradiation light on the object. The processing part 300 acquires the reflectance information of the object as object information and performs processing of commands designated by the object based on the acquired reflectance information.

Thereby, the embodiment can be applied not only to the case realized as hardware but also to the case of performing processing as software (program) mounted on the optical detection system. Further, the program is recorded in an information recording medium. Here, as the information recording medium, various recording media readable by the optical detection system such as an optical disk of a DVD, CD, or the like, a magneto-optical disk, a hard disk (HDD), a nonvolatile memory, a memory of a RAM or the like may be envisioned.

2.2 Second Embodiment

Next, an example using a pen-shaped object as an object will be explained. In the embodiment, the object has only two reflectances.

One example is shown in FIG. 7A and FIG. 7B. The pen-shaped object of the embodiment has a structure having a first reflection surface with the first reflectance and a second reflection surface with the second reflectance higher than the first reflectance. That is, the reflectance of the object is varied depending on whether the irradiation light is reflected by the first reflection surface or reflected by the second reflection surface. Specifically, in the state in which the object is used with the first reflectance, the pen-shaped object is turned to 180° in the hand (the state in FIG. 7A is changed to the state in FIG. 7B), and thereby, the reflectance can be changed to the second reflectance.

Further, another example is shown in FIG. 8A and FIG. 8B. In this example, the pen-shaped object has a projection with the higher reflectance than that of the pen main body. The reflectance is varied depending on whether the projection is retracted as shown in FIG. 8A or the projection is stuck out as shown in FIG. 8B. Compared to the case where the projection is retracted as shown in FIG. 8A, the reflectance is higher in the case where the high-reflection projection is stuck out as shown in FIG. 8B. Specifically, for example, if a button for sticking out the projection is provided on the pen main body, the state can be changed from the first reflectance to the second reflectance by pressing down the button.

The example using two reflectances is the same as the first embodiment. For example, in the case of a character drawing system, one may be associated with the input designation command and the other may be associated with the end designation command.

In the above described embodiment, the object may be the pen-shaped object. The pen-shaped object has the first reflection surface with the first reflectance and the second reflection surface with the second reflectance higher than the first reflectance. The processing part 300 acquires first reflected light information acquired by the light reception result of the reflected light from the first reflection surface and second reflected light information acquired by the light reception result of the reflected light from the second reflection surface. Further, the processing part may perform processing of commands based on the first reflected light information and the second reflected light information.

Thereby, the pen-shaped object as shown in FIG. 7A and FIG. 7B can be used as the object. Using the pen-shaped object, plural reflectances may be provided to a single object. Accordingly, in this example, the commands can be easily switched only by changing the holding angle of the pen to 180° in the hand.

Further, the object may be the pen-shaped object, the pen-shaped object may have the projection part of a member with reflectance different from that of the main body part, and may stick out and retract the projection part by predetermined operation as shown in FIG. 8A and FIG. 8B. The processing part 300 acquires reflectance information when the projection part is retracted as the first reflected light information and reflectance information when the projection part is stuck out as the second reflected light information. Further, the processing part may perform processing of commands based on the first reflected light information and the second reflected light information.

Thereby, the pen-shaped object as shown in FIG. 8A and FIG. 8B can be used as the object. Using the pen-shaped object, plural reflectances may be provided to a single object. Accordingly, in this example, the commands can be easily switched only by pressing down the button for operation of the projection part.

2.3 Third Embodiment

The object has two reflectances in the first embodiment and the second embodiment, however, an example using three or more reflectances will be explained in the embodiment.

As shown in FIG. 9, here, a human hand is used as an object. Specifically, four reflectances are realized using the case of using a fist and the respective cases of three fingers, two fingers, and one finger. Here, in the case where fingers are used, the reflectance is larger for two fingers than one finger as described above. Similarly, the reflectance is larger for three fingers than two fingers. Further, the reflectance is larger for a fist than three fingers. That is, as shown in FIG. 9, given that the reflectance corresponding to one finger is R1, the reflectance corresponding to two fingers is R2, the reflectance corresponding to three fingers is R3, and the reflectance corresponding to a fist is R5, R5>R3>R2>R1 holds.

Figure 10:
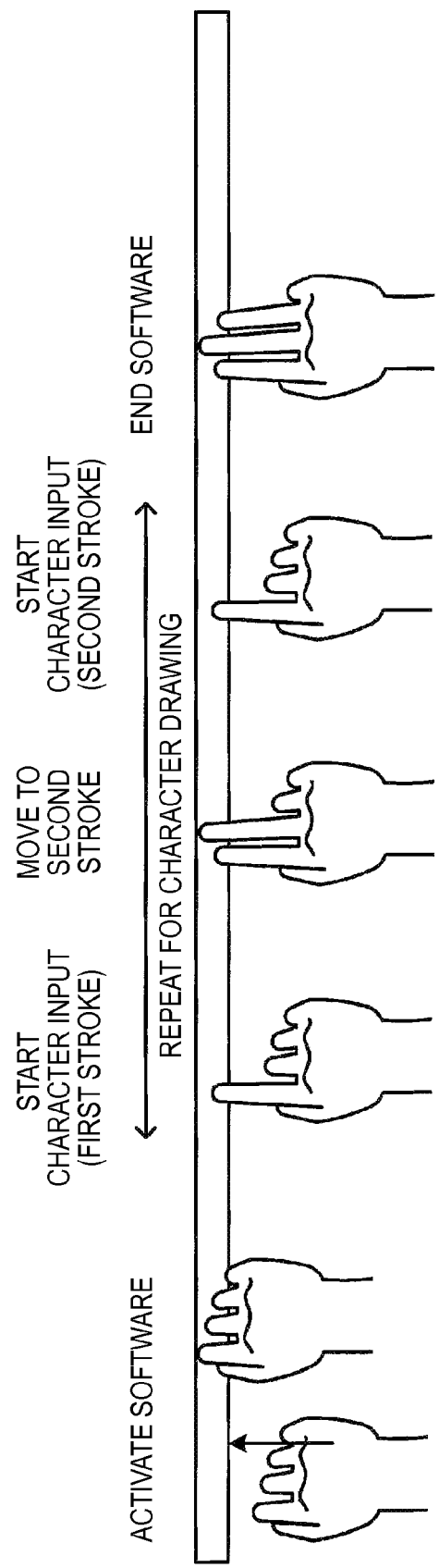
FIG. 10 shows an example of operating shape drawing software using four reflectances.

Thereby, four reflectances may be realized and four kinds of commands can be determined. Specifically, for example, as shown in FIG. 10, first, character input software is activated by moving a fist into the sensing range. Then, as described above in the first embodiment, character input is performed for one stroke at a time by repeating an input designation command by one finger and an end designation command by two fingers. Then, at the time when the character input is ended, the software is ended by three fingers. That is, as commands, four kinds of commands of the input designation command, the end designation command, the soft activation command, the soft end command can be determined.

In this manner, in the case where the system has plural applications including character input, they can be handled. That is, in the example in which two kinds of commands are executed using two reflectances, it may be impossible to activate the software itself, and the example may be applied only to a system having other input means or a system having a single application. However, by increasing the patterns of reflectances to determine many commands as in the embodiment, the method of the embodiment can be applied to general-purpose system such as a PC.

Note that the application executed in the system is not limited to the character input software. As a specific example, an example as an alternative to mouse operation will be described later in the fourth embodiment.

2.4 Fourth Embodiment

Figure 11:
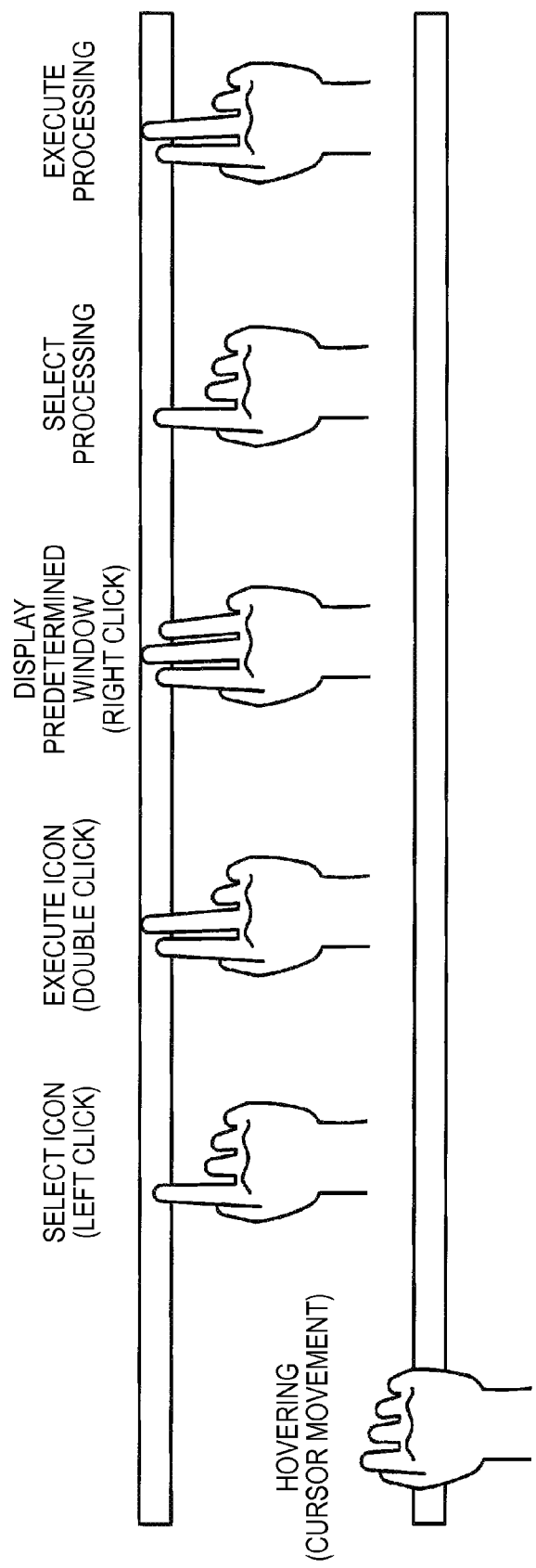
FIG. 11 shows an example of performing an alternative to mouse operation using four reflectances.

In an example in which four kinds of commands are executed using four reflectances like the third embodiment, an alternative to mouse operation can be performed as shown in FIG. 11. For example, commands of selection and execution of icons etc. are performed in an application such as a filer.

In the embodiment, plural (here, two, but not limited) sensing ranges are set in the Z-axis direction. This may be realized by arranging plural light receiving devices in different positions on the Z-axis, for example. The first sensing range near the target surface corresponds to a command execution area and the second sensing range far from the target surface corresponds to a hovering area. The command execution area is an area in which command processing corresponding to conclusive operation of selection, execution, or the like of icons (left click or the like in mouse operation) is performed, and the hovering area is an area in which command processing corresponding to inconclusive operation of movement of cursors or the like is performed.

In this manner, as shown in FIG. 11, the position of the cursor on the screen may be moved by moving the fist in the hovering area. Then, the icon corresponding to the cursor position is selected by sticking out one finger in the command execution area (corresponding to the left click). The icon is executed by sticking out two fingers with the appropriate icon selected (corresponding to the double click). Further, a predetermined window may be displayed by sticking out three fingers with the icon selected (corresponding to the right click, for example, executable processing of "open", "copy", "cut", "delete", etc. for the selected icon are displayed). One processing of plural processings is selected by sticking out one finger with the plural executable processings displayed. Then, the selected processing is executed by sticking out two fingers with the processing selected.

Thereby, the function of an input device like a mouse can be replaced. Note that, in the embodiment, the example of one finger in the command execution area has been explained as the selection command and the example of two fingers in the command execution area has been explained as the execution command. On the other hand, regarding the mouse operation, correspondence relationships such that one finger corresponds to single click and two fingers correspond to double click are not established because the execution command may be single click (left click) or double click. Note that the correspondence relationships between the numbers of fingers (or the fist) and commands can be arbitrarily set, and mouse clicks and the numbers of fingers may be set in one-to-one correspondences.

Further, in the embodiment, the case where the sensing ranges are two of the command execution area and the hovering area has been explained, but not limited to that. Since the movement of cursors and selection and execution of icons can be determined depending on the reflectance of the object, the function of the embodiment may be realized with only one sensing range. Note that, by setting the hovering area, the inconclusive operation of hovering (for example, movement of cursors) can be intuitively understood. For example, in a character input application, if correspondences are set so that character drawing may be performed in the command execution area and movement of the drawing target position (movement of cursors) may be performed in the hovering area, the correspondence relationships with actual drawing operations using paper and pens may be clarified. That is, because of the operation settings such that character drawing is performed in a position near the target surface and movement of cursors is performed in a position far from the target surface, correspondence relationships with actual drawing operations such that a pen (corresponding to the object) may be moved close to the paper (corresponding to the target surface) when a character is drawn and the pen may be floated from the paper when no character is drawn but the pen is moved become clear and intuitive operation can be performed.

Furthermore, if the differences of the positions of the plural sensing ranges are clearly understandable for the user (the user may consciously use the command execution area and the hovering area depending on the purposes), the effect of increasing the number of kinds of commands may be expected. That is, the first command is assigned to the fist in the hovering area and the second command is assigned to the fist in the command execution area. Similarly, in the case of one finger, different commands are assigned to the hovering area and the command execution area. Further, the same is applicable to the cases of two fingers and three fingers. In this manner, even if there are only four reflectances of the object themselves, by providing two sensing areas, eight kinds of commands can be determined. If the number of sensing ranges is increased, the number of commands that can be determined is increased by the number. Note that attention is necessary because, by increasing the number of sensing ranges, it becomes difficult to recognize the differences among the positions of the sensing ranges and it becomes highly possible to execute a command different from that intended by the user.

In the above described embodiment, the processing part 300 may determine the designation command and the execution command based on the change in reflectance represented by the reflectance information. Here, the designation command is a command to designate the execution target command and the execution command is a command to execute the execution target command designated by the designation command. Specifically, for example, in the case where an application like a filer is assumed, the designation command is a command to designate the execution target command associated with the icon in the position on the image shown by the object. Further, the execution command is a command to execute the execution target command designated by the designation command (the execution target command associated with the icon). The processing part 300 performs processing corresponding to the designation command if the reflectance of the object is the first reflectance, and then, if the reflectance of the object turns to the second reflectance different from the first reflectance, performs processing corresponding to the execution command.

Thereby, determination between the designation command and the execution command can be performed. Specifically, for example, as shown in FIG. 11, in an application like a filer, mouse operation can be replaced. The specific example of processing is as described above, and the reflectance is changed depending on the fist or the number of fingers, and operations corresponding to left click, right click, double click, etc. are performed depending on the differences in reflectance.

Further, if the Z-coordinate range of the object from the target surface is detected to be the first Z-coordinate range, the processing part 300 performs command processing using the X-coordinate information and the Y-coordinate information of the object. If the Z-coordinate range of the object is detected to be the second Z-coordinate range, the processing part performs hovering processing using the X-coordinate information and the Y-coordinate information of the object.

Here, the X-axis, Y-axis, Z-axis as criteria of the respective X, Y, Z coordinates are set as shown in FIGS. 1A and 1B, for example. The target surface 20 is contained in the XY-plane and the direction perpendicular to the XY-plane, i.e., perpendicular to the target surface is the Z-axis.

Figure 12:
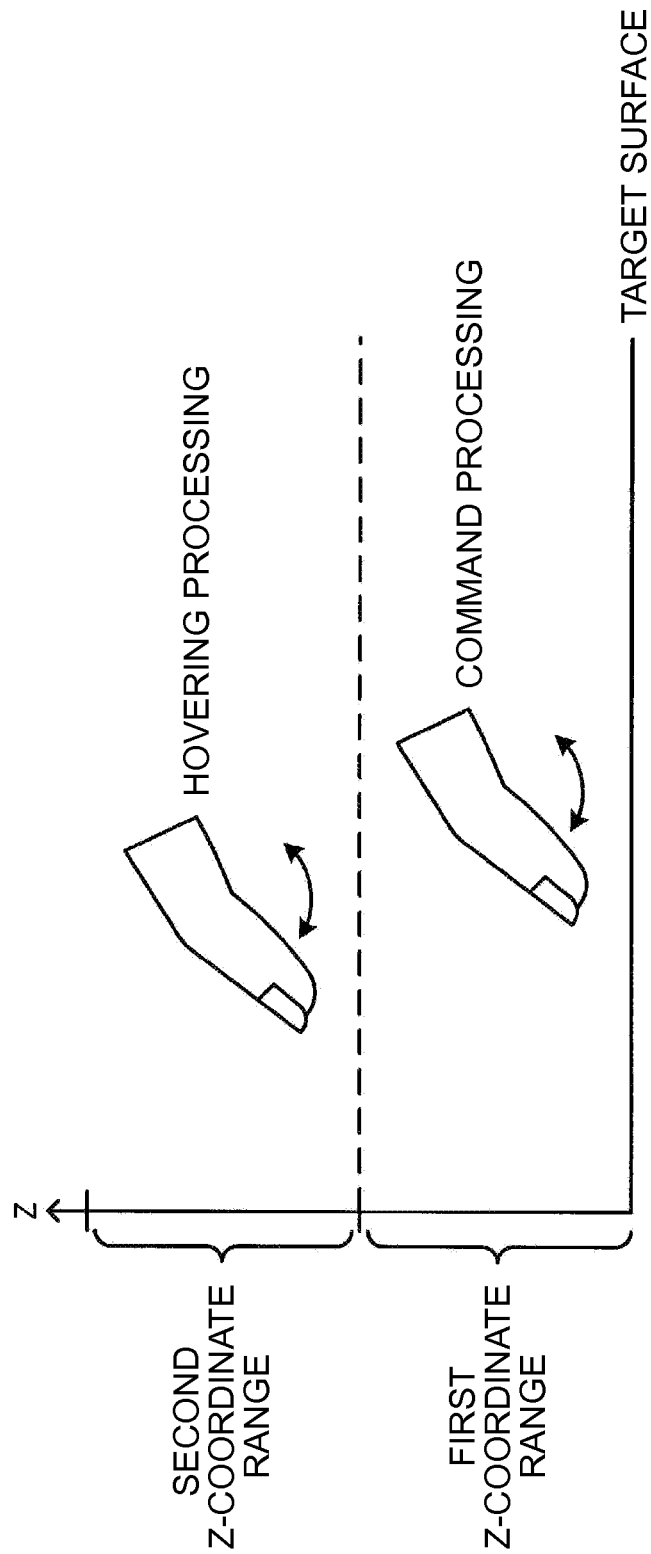
FIG. 12 shows an example of setting of a first Z-coordinate range and a second Z-coordinate range.

Further, the first Z-coordinate range and the second Z-coordinate range are set as shown in FIG. 12, for example. The first Z-coordinate range is nearer the target surface in the Z-axis direction compared to the second Z-coordinate range. The respective Z-coordinate ranges are freely set as long as the above described conditions are satisfied. For example, in the example of FIG. 12, the first Z-coordinate range and the second Z-coordinate range are adjacent, however, not limited to that. For example, a third Z-coordinate range may be provided between the respective Z-coordinate ranges for use as a buffer region.

Furthermore, here, the command processing refers to at least one of command determination and command execution. Processing corresponding to the content of a certain command corresponds to determination of the command and performance of execution of the command. In the embodiment, in the case where only the determination of commands is performed and their execution is performed after a time interval, the command processing is performed. However, the embodiment is not limited to that, but command processing may be the performance of command execution.

Thereby, in the optical detection system according to the embodiment, using the Z-coordinate information of the object, command processing (concluding function) and hovering processing (floating function) can be switched. Accordingly, in the above described shape input system and application such as a filer, conclusive operation and inconclusive operation can be smoothly switched and an interface that is intuitively and easily used for a user may be realized.

Further, the processing part 300 may perform determination processing of the kinds of commands based on reflectance information when the object is in the first Z-coordinate range.

Thereby, if the object is in the first Z-coordinate range, that is, if the object is in the position nearer the target surface than in the second Z-coordinate range, determination processing of the kinds of commands can be performed. As described above, if the object is nearer the target surface, conclusive operation is assumed to be performed, and the determination processing of the kinds of commands is mainly performed based on the reflectance information when the object is in the first Z-coordinate range.

In addition, the processing part 300 may perform calibration processing on the reflectance information when the object is in the first Z-coordinate range.

Thereby, using the reflectance information when the object is in the first Z-coordinate range, calibration on the reflectance information can be performed. As described above, it is conceivable that the reflectance varies depending on the thicknesses and the lengths of the user's fingers when the same fingers are used. Accordingly, it is effective to perform calibration for absorbing differences among individuals or the like. Note that, in the embodiment, when command processing is actually performed, calibration is performed in the first Z-coordinate range assumed to be mainly used, however, not limited to that. Using the reflectance information in the second Z-coordinate range, calibration of the reflectance information may be performed.

3. Method of Coordinate Information Detection

Figure 13A:
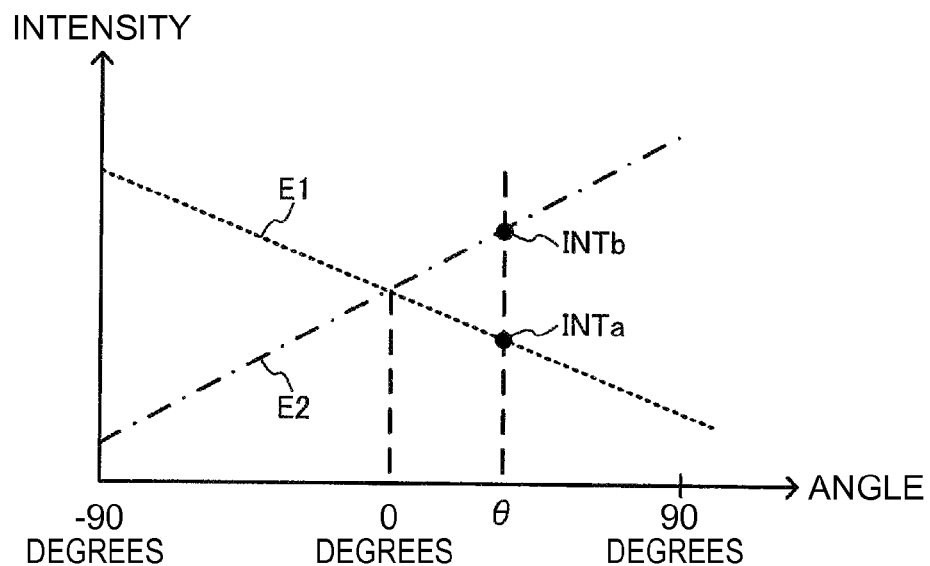
FIG. 13A and FIG. 13B are diagrams for explanation of a method of coordinate information detection.
Figure 13B:
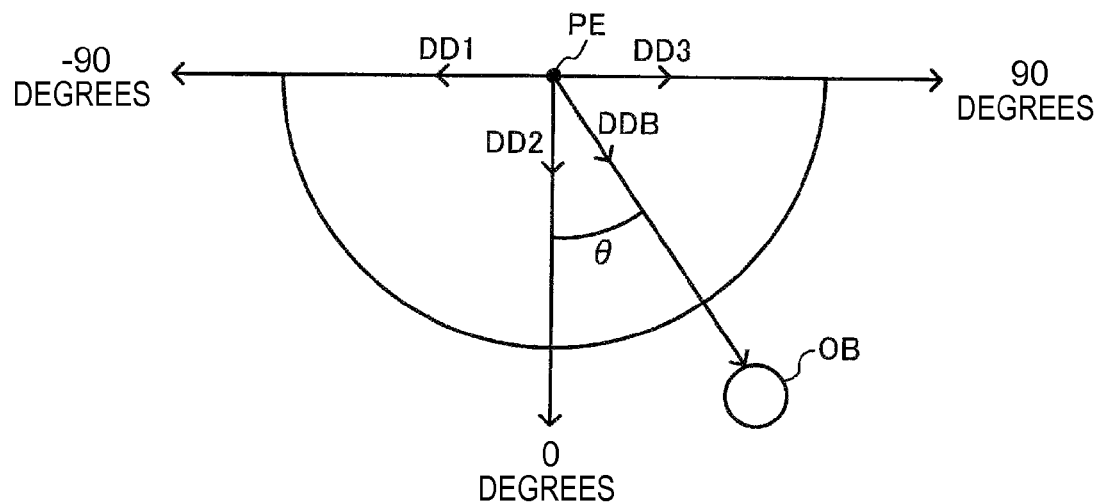

FIG. 13A and FIG. 13B are diagrams for explanation of a method of coordinate information detection using the optical detector 100 including the optical detection system of the embodiment.

E1 in FIG. 13A shows a relationship between an angle in the irradiation direction of the irradiation light LT1 and intensity of the irradiation light LT1 at the angle in the irradiation light intensity distribution LID1 in FIG. 5. In E1 in FIG. 13A, the intensity is the highest when the irradiation direction is the direction of DD1 (leftward direction) in FIG. 13B. On the other hand, the intensity is the lowest when the irradiation direction is the direction of DD3 (rightward direction) and the intermediate intensity in the direction of DD2. Specifically, the intensity of the irradiation light monotonically decreases according to the angle change from the direction DD1 to the direction DD3, for example, linearly changes. Note that, in FIG. 13B, the center position of the arc shape of the light guide LG is the placement position PE of the irradiation part EU.

Further, E2 in FIG. 13A shows a relationship between an angle in the irradiation direction of the irradiation light LT2 and intensity of the irradiation light LT2 at the angle in the irradiation light intensity distribution LID2 in FIG. 5. In E2 in FIG. 13A, the intensity is the highest when the irradiation direction is the direction of DD3 in FIG. 13B. On the other hand, the intensity is the lowest when the irradiation direction is the direction of DD1 and the intermediate intensity in the direction of DD2. Specifically, the intensity of the irradiation light monotonically decreases according to the angle change from the direction DD3 to the direction DD1, for example, linearly changes. Note that, in FIG. 13A, the relationship between the angle of the irradiation direction and the intensity is linear, however, the embodiment is not limited to that, but may be a hyperbolic relationship or the like, for example.

As shown in FIG. 13B, it is assumed that the object OB exists in the direction DDB at angle θ. When the irradiation light intensity distribution LID1 is formed by light emission of the light source LS1 (in the case of E1), as shown in FIG. 13A, the intensity in the position of the object OB existing in the direction of DDB (angle θ) is INTa. On the other hand, when the irradiation light intensity distribution LID2 is formed by light emission of the light source LS2 (in the case of E2), the intensity in the position of the object OB existing in the direction of DDB (angle θ) is INTb.

Figure 14A:
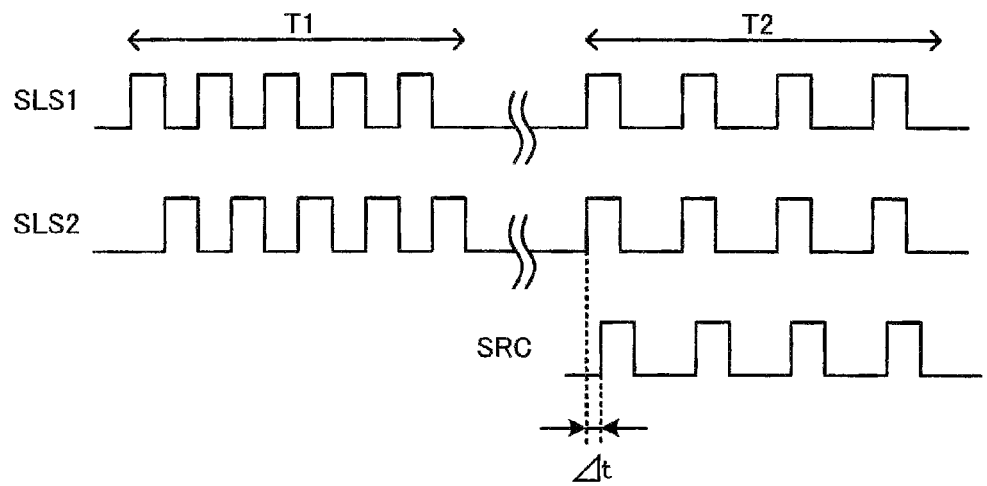
FIG. 14A and FIG. 14B show signal waveform examples of light emission control signals.
Figure 14B:
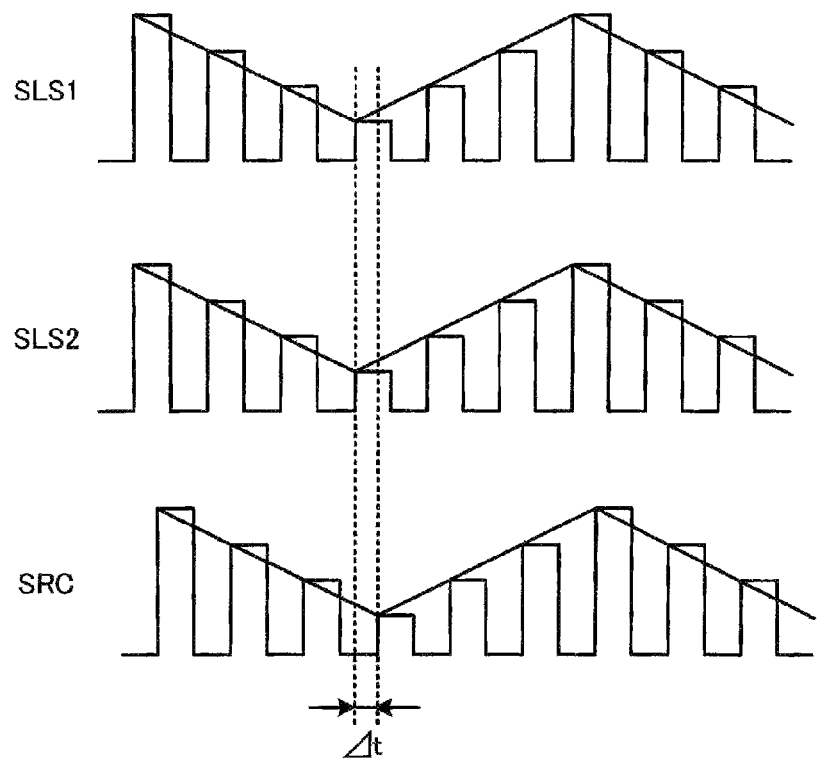
Figure 15:
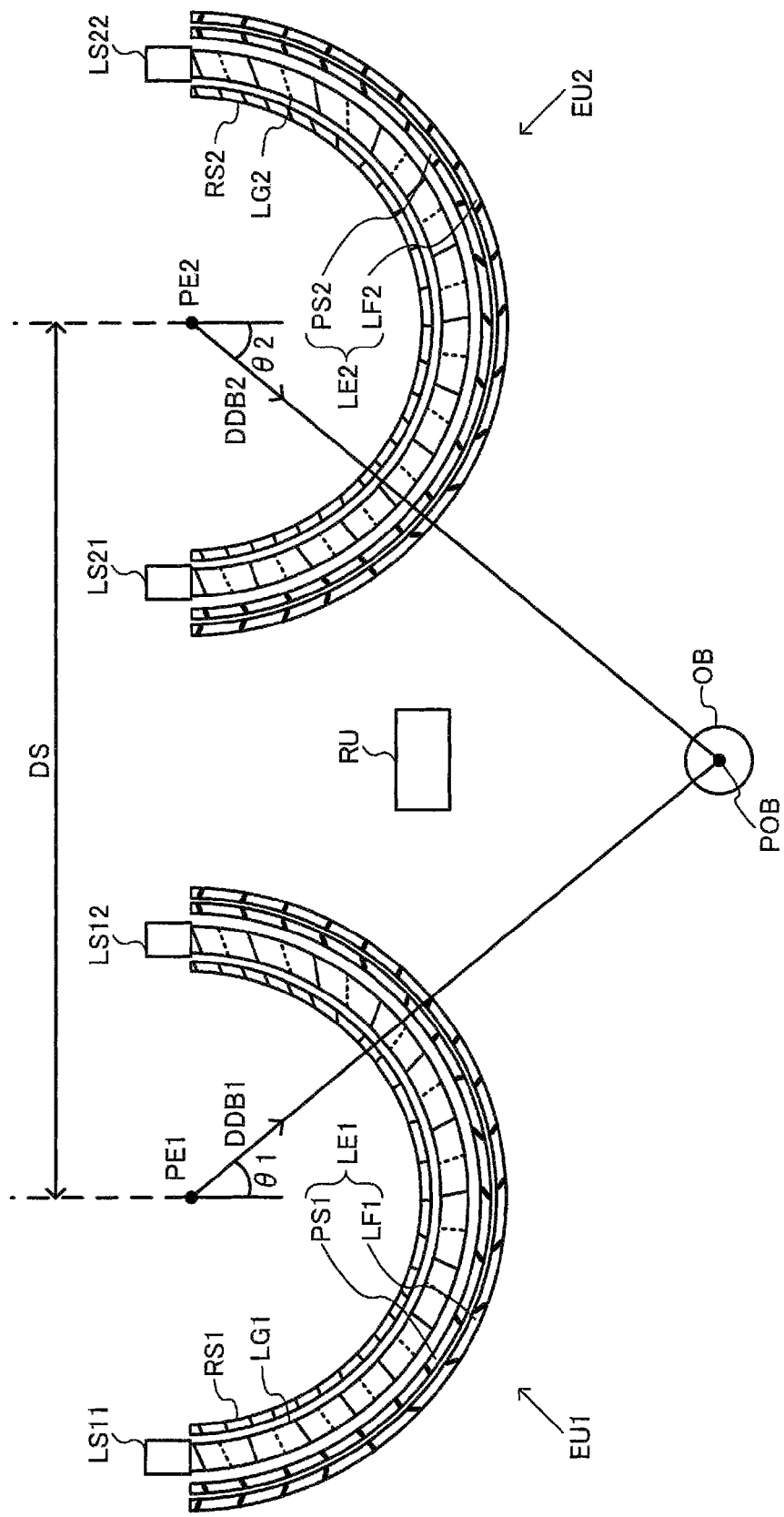
FIG. 15 shows another configuration example of the irradiation part.

Therefore, by obtaining the relationship between the intensity INTa, INTb, the direction DDB (angle θ) in which object OB is located may be specified. Then, for example, by obtaining the distance of the object OB from the placement position PE of the optical detector according to the method in FIG. 14A and FIG. 14B, which will be described later, the position of the object OB may be specified based on the obtained distance and the direction DDB. Alternatively, as shown in FIG. 15, which will be described later, by providing two irradiation units EU1, EU2 as the irradiation part EU and obtaining directions DDB1 (θ1), DDB2 (θ2) of the object OB relative to the respective irradiation units EU1, EU2, the position of the object OB may be specified from these directions DDB1, DDB2 and the distance between the irradiation units EU1, EU2.

In order to obtain the relationship between the intensity INTa, INTb, in the embodiment, the light receiving part RU receives reflected light (first reflected light) of the object OB when the irradiation light intensity distribution LID1 is formed. Given that the amount of detected received light of the reflected light is Ga, the Ga corresponds to the intensity INTa. Further, the light receiving part RU receives reflected light (second reflected light) of the object OB when the irradiation light intensity distribution LID2 is formed. Given that the amount of detected received light of the reflected light is Gb, the Gb corresponds to the intensity INTb. Therefore, if the relationship between the amounts of detected received light Ga and Gb is obtained, the relationship between the intensity INTa, INTb is obtained, and the direction DDB in which the object OB is located may be obtained.

For example, given that the amount of control (e.g., amount of current), the conversion coefficient, the amount of emitted light of the light source LS1 are Ia, k, Ea, respectively, and the amount of control (e.g., amount of current), the conversion coefficient, the amount of emitted light of the light source LS2 are Ib, k, Eb, respectively, the following equations (1), (2) hold.

$$Ea = k \cdot Ia \quad (1)$$

$$Eb = k \cdot Ib \quad (2)$$

Further, given that the attenuation factor of the light source light (first light source light) from the light source LS1 is fa and the amount of detected received light of the reflected light (first reflected light) corresponding to the light source light is Ga, and the attenuation factor of the light source light (second light source light) from the light source LS2 is fb and the amount of detected received light of the reflected light (second reflected light) corresponding to the light source light is Gb, the following equations hold.

$$Ga = fa \cdot Ea = fa \cdot k \cdot Ia \quad (3)$$

$$Gb = fb \cdot Eb = fb \cdot k \cdot Ib \quad (4)$$

Therefore, the ratio between the amount of detected received lights Ga, Gb is expressed by the following equation (5).

$$Ga/Gb = (fa/fb) \cdot (Ia/Ib) \quad (5)$$

Here, Ga/Gb may be specified from the light reception result in the light receiving part RU, and Ia/Ib may be specified from the amount of control of the irradiation part EU. Further, the intensity INTa, INTb and the attenuation factors fa, fb in FIG. 13A have unique relationships. For example, when the attenuation factors fa, fb take smaller values and the amount of attenuation is larger, the intensity INTa, INTb is smaller. On the other hand, when the attenuation factors fa, fb take larger values and the amount of attenuation is smaller, the intensity INTa, INTb is larger. Therefore, by obtaining the ratio of attenuation rates fa/fb from the above equation (5), the direction, position, etc. of the object can be obtained.

More specifically, one amount of control Ia is fixed to Im, and the other amount of control Ib is controlled so that the ratio between the amounts of detected received light Ga/Gb may be "1". For example, control of alternately lighting the light sources LS1, LS2 at opposite phases is performed, the waveforms of the amounts of detected received light are analyzed, and the other amount of control Ib is controlled so that the detection waveforms may not be observed (Ga/Gb=1). Then, the ratio between the attenuation factors fa/fb is obtained from the other amount of control Ib=Im·(fa/fb), and the direction, position, etc. of the object are obtained.

Furthermore, as in the following equations (6), (7), the control may be performed so that Ga/Gb=1 and the sum of the amounts of control Ia and Ib may be constant.

$$Ga/Gb = 1 \quad (6)$$

$$Im = Ia + Ib \quad (7)$$

By substitution of the equations (6), (7) into the equation (5), the following equation (8) holds.

$$Ga/Gb = 1 = (fa/fb) \cdot (Ia/Ib) \quad (8)$$
$$= (fa/fb) \cdot \{(Im - Ib)/Ib\}$$

From the equation (8), Ib is expressed by the following equation (9).

$$Ib = \{fa/(fa+fb)\} \cdot Im \quad (9)$$

Here, given that α=fa/(fa+fb), the equation (9) is expressed by the following equation (10), and the ratio between the attenuation factors fa/fb is expressed using α by the following equation (11).

$$Ib = \alpha \cdot Im \quad (10)$$

$$fa/fb = \alpha/(1-\alpha) \quad (11)$$

Therefore, if the control is performed so that Ga/Gb=1 and the sum of Ia and Ib may be the constant value Im, α is obtained from the Ib, Im using the equation (10), the obtained α is substituted into the equation (11), and thereby, the ratio between the attenuation factors fa/fb may be obtained. Thereby, the direction, position, etc. of the object can be obtained. Further, if the control is performed so that Ga/Gb=1 and the sum of Ia and Ib may be constant, the influence of external perturbation light etc. can be cancelled out and the detection accuracy may be improved.

Next, an example of a method of detecting coordinate information of the object using the optical detection system of the embodiment will be explained. FIG. 14A shows signal waveform examples with respect to light emission control of the light sources LS1, LS2. A signal SLS1 is a light emission control signal of the light source LS1, a signal SLS2 is a light emission control signal of the light source LS2, and these signals SLS1, SLS2 are signals at opposite phases. Further, a signal SRC is a light reception signal.

For example, the light source LS1 turns on (emits light) when the signal SLS1 is at the H level, and turns off when the signal is at the L level. Further, the light source LS2 turns on (emits light) when the signal SLS2 is at the H level, and turns off when the signal is at the L level. Therefore, in the first period T1 in FIG. 14A, the light source LS1 and the light source LS2 alternately turn on. That is, in a period in which the light source LS1 turns on, the light source LS2 turns off. Thereby, the irradiation light intensity distribution LID1 as shown in FIG. 5 is formed. On the other hand, in a period in which the light source LS2 turns on, the light source LS1 turns off. Thereby, the irradiation light intensity distribution LID2 as shown in FIG. 5 is formed.

In this manner, the detection part 200 performs control to alternately allow the light source LS1 and the light source LS2 to emit light (turn on) in the first period T1. Then, in the first period T1, the direction in which the object is located seen from the optical detector (irradiation part) is detected. Specifically, for example, the light emission control so that Ga/Gb=1 and the sum of the amounts of control Ia and Ib may be constant as expressed in the above described equations (6), (7) is performed in the first period T1. Then, as shown in FIG. 13B, the direction DDB in which the object OB is located is obtained. For example, the ratio between the attenuation factors fa/fb is obtained from the equations (10), (11), and the direction DDB in which the object OB is located is obtained according to the method explained in FIG. 13A, FIG. 13B.

Then, in the second period T2 subsequent to the first period T1, the distance to the object OB (the distance in the direction along the direction DDB) is detected based on the light reception result of the light receiving part RU. Then, the position of the object is detected based on the detected distance and the direction DDB of the object OB. That is, as shown in FIG. 13B, by obtaining the distance from the placement position PE of the optical detector to the object OB and the direction DDB in which the object OB is located, X- and Y-coordinate positions of the object OB may be specified. In this manner, the position of the object OB may be specified by obtaining the distance from the shift between the lighting timing of the light source and the receiving timing and using the distance and the angle result.

Specifically, in FIG. 14A, the time Δt from the light emission timing of the light sources LS1, LS2 by the light emission control signals SLS1, SLS2 to the timing when the light reception signal SRC becomes active (the timing when the reflected light is received) is detected. That is, the time Δt from when the lights from the light sources LS1, LS2 are reflected on the object OB to when the lights are received by the light receiving part RU is detected. By detecting the time Δt, the distance to the object OB may be detected because the velocity of light is known. That is, the shift (time) of the times when light reaches is measured and the distance is obtained from the velocity of light.

Note that, since the velocity of light is very high, there is a problem that the detection of the time Δt is difficult by obtaining a simple difference using electric signals only. To solve the problem, as shown in FIG. 14B, it is desirable to perform modulation of the light emission control signals. Here, FIG. 14B shows schematic signal wavelength examples schematically representing light intensity (amounts of current) by amplitudes of the control signals SLS1, SLS2.

Specifically, in FIG. 14B, for example, the distance is detected in a TOF (Time Of Flight) method of known continuous wave modulation. In the continuous wave modulation TOF method, continuous light intensity-modulated by the continuous wave in a constant period is used. Further, the waveform of the reflected light is demodulated by applying the intensity-modulated light and receiving the reflected light at plural times at shorter time intervals than the modulation period, and the distance is detected by obtaining the phase difference between the irradiation light and the reflected light. Note that, in FIG. 14B, only the light corresponding to one of the control signals SLS1, SLS2 may be intensity-modulated. Further, not only the clock waveform shown in FIG. 14B but also waveforms modulated by continuous triangular wave and Sin wave may be used. Furthermore, the distance may be detected using a TOF method of pulse modulation using pulsed light as continuously modulated light. The details of the distance detection method is disclosed in JP-A-2009-8537 etc., for example.

FIG. 15 shows a modified example of the irradiation part EU of the embodiment. In FIG. 15, first and second irradiation units EU1, EU2 are provided as the irradiation part EU. These first and second irradiation units EU1, EU2 are placed at a given distance DS in the direction along the surface of the detection area RDET of the object OB. That is, the units are placed at the distance DS along the X-axis direction of FIG. 1A, FIG. 1B.

The first irradiation unit EU1 radially outputs first irradiation light having intensity different depending on the irradiation direction. The second irradiation unit EU2 radially outputs second irradiation light having intensity different depending on the irradiation direction. The light receiving part RU receives first reflected light by the reflection of the first irradiation light from the first irradiation unit EU1 on the object OB and second reflected light by the reflection of the second irradiation light from the second irradiation unit EU2 on the object OB. Then, the detection part 200 detects the position POB of the object OB based on the light reception result in the light receiving part RU.

Specifically, the detection part 200 detects the direction of the object OB relative to the first irradiation unit EU1 as the first direction DDB1 (angle θ1) based on the light reception result of the first reflected light. Further, the detection part detects the direction of the object OB relative to the second irradiation unit EU2 as the second direction DDB2 (angle θ2) based on the light reception result of the second reflected light. Then, the position POB of the object OB is obtained based on the detected first direction DDB1 (angle θ1) and second direction DDB2 (angle θ2) and the distance DS between the first and second irradiation units EU1, EU2.

According to the modified example in FIG. 15, the position POB of the object OB may be obtained without obtaining the distance between the optical detector and the object OB as in FIG. 14A and FIG. 14B.

In this case, in the detection method of Z-coordinates, plural light receiving units may be provided in the Z-axis direction, however, not limited to that. For example, the method may be realized by providing irradiation units having the configuration in FIG. 5 like B1 to B5 in FIG. 16.

Figure 16:
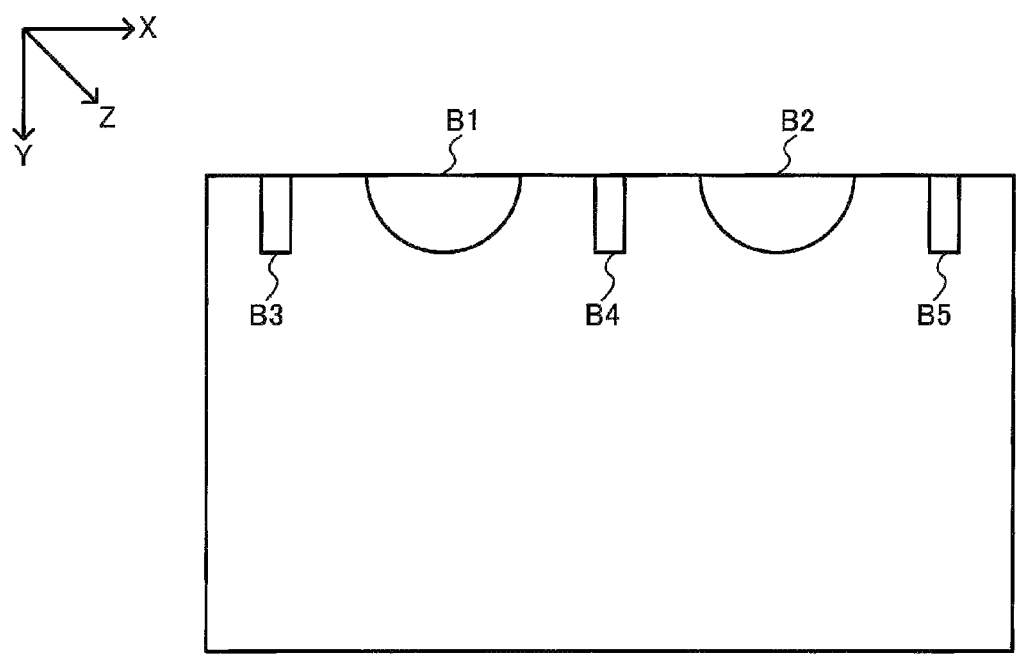
FIG. 16 shows another configuration example of an optical detector for detecting Z-coordinates.

B1 and B2 in FIG. 16 are for the purpose of obtaining the X-coordinate and the Y-coordinate (or the angle θ) of the object as described above. Further, using B3 to B5 provided in directions orthogonal to B1 and B2, the Z-coordinate is obtained. B3 to B5 may detect two-dimensional coordinates (or angle) of the object within a plane orthogonal to the XY-plane (the YZ-plane in the example of FIG. 16), and the Z-coordinate of the object can be specified.

Here, the example in which three irradiation units are provided for detection of the Z-coordinate has been explained, however, the number of irradiation units is not limited to that. The number may be two or less, or four or more. Note that the irradiation light from the irradiation unit is applied along a plane though spreading to some degree. That is, in the example of FIG. 16, the irradiation lights of the irradiation units of B3 to B5 are only applied to a narrow range in the X-axis direction. Accordingly, the range in the X-axis direction in which the Z-coordinate can be detected by one irradiation unit is limited to a narrow range, and it is desirable to provide plural irradiation units as in the example of FIG. 16 for detection of the Z-coordinate in a wide region.

The embodiment has been explained in detail, and the person skilled in the art could easily understand that many modifications can be made without substantively departing from the new matter and effects of the invention. Therefore, these modifications are included in the scope of the invention. For example, in the specification and the drawings, the terms at least with the terms in broader or the same meaning may be replaced by the different terms in any part of the specification and the drawings. Further, the configurations and operations of the optical detector, the display device, and electronic equipment are not limited to those explained, and various modifications can be embodied.

The entire disclosure of Japanese Patent Application No. 2010-252556, filed Nov. 11, 2010 is expressly incorporated by reference herein.

What is claimed is:

1. An optical detection system comprising:
    a detection part that detects object information as information of an object based on a light reception result of reflected light by reflection of irradiation light on the object; and
    a processing part that performs processing based on the object information,
    wherein the processing part acquires first and second reflectance information of the object as the object information,
    when the processing part receives the first reflectance information that corresponds to a first reflectance ratio of the object, the processing part performs a first command corresponding to the first reflectance information,
    when the processing part receives the second reflectance information that corresponds to a second reflectance ratio of the object, the processing part performs a second command corresponding to the second reflectance information,
    the first reflectance ratio is changed to the second reflectance ratio by one of changing an area of a reflection surface of the object and changing a reflection ratio of the reflection surface of the object,
    the first command is different from the second command,
    the processing part performs command processing of at least one of command determination and command execution using X-coordinate information and Y-coordinate information of the object if a Z-coordinate range of the object from a target surface is detected to be a first Z-coordinate range near the target surface, and
    the processing part performs hovering processing as processing for hovering operation using the X-coordinate information and the Y-coordinate information of the object if the Z-coordinate range of the object from the target surface is detected to be a second Z-coordinate range farther than the first Z-coordinate range, and
    the processing part performs calibration processing on the first and second reflectance information when the object is in the first Z-coordinate range.

2. The optical detection system according to claim 1, wherein
    the first command corresponds to an input designation command, and
    the second command corresponds to an end designation command.

3. The optical detection system according to claim 2, wherein the input designation command designates an input start of shape input by the object, and
    the end designation command designates an input end of shape input by the object.

4. The optical detection system according to claim 1, wherein the processing part performs determination of a designation command to designate an execution target command and an execution command to execute the execution target command designated by the designation command based on the first and second reflectance information.

5. The optical detection system according to claim 4, wherein when the object has the first reflectance ratio, the processing part determines that the execution target command has been designated by the designation command, and then, when the object has the second reflectance ratio, the processing part executes the execution target command designated by the designation command by the execution command.

6. The optical detection system according to claim 1, wherein the object is a user's finger, and
    the first and second reflectance ratios correspond to differences of the number of fingers existing in a detection region.

7. The optical detection system according to claim 1, wherein the object is a pen-shaped object,
    the pen-shaped object has a first reflection surface with the first reflectance ratio and a second reflection surface with the second reflectance ratio higher than the first reflectance ratio, and
    the processing part acquires the first reflectance information acquired from a light reception result of reflected light from the first reflection surface and the second reflectance information acquired from a light reception result of reflected light from the second reflection surface, and performs processing of the first and second commands based on the first reflection information and the second reflection information.

8. The optical detection system according to claim 1, wherein the object is a pen-shaped object,
    the pen-shaped object is an object having a projection part including a member having the second reflectance ratio different from the first reflectance ratio of a main body part in a state of the projection part switched between a retracted state and a non-retracted state by a predetermined operation, and the processing part acquires the first reflectance information acquired from a light reception result of reflected light by the pen-shaped object when the projection part is in the retracted state and the second reflectance information acquired from a light reception result of reflected light by the pen-shaped object when the projection part is in the non-retracted state, and performs the first and second commands based on the first reflectance information and the second reflectance information.

9. The optical detection system according to claim 1, wherein the processing part performs determination processing of the first and second commands based on the first and second reflectance information, respectively, when the object is in the first Z-coordinate range.

10. The optical detection system according to claim 1, further comprising:

an irradiation part that outputs irradiation light to a detection region; and a light receiving part that receives the reflected light.

11. A computer program product embodying computer readable instructions stored on a non-transitory computer readable medium for causing execution in a computer, the computer program product comprising:

instructions for a detection part to detect object information as information of an object based on a light reception result of reflected light by reflection of irradiation light on the object; and instructions for a processing part to perform processing based on the object information, wherein the processing part acquires first and second reflectance information of the object as the object information, when the processing part receives the first reflectance information that corresponds to a first reflectance ratio of the object, the processing part performs a first command corresponding to the first reflectance information, when the processing part receives the second reflectance information that corresponds to a second reflectance ratio of the object, the processing part performs a second command corresponding to the second reflectance information, the first reflectance ratio is changed to the second reflectance ratio by one of changing an area of a reflection surface of the object and changing a reflection ratio of the reflection surface of the object, the first command is different from the second command, the processing part performs command processing of at least one of command determination and command execution using X-coordinate information and Y-coordinate information of the object if a Z-coordinate range of the object from a target surface is detected to be a first Z-coordinate range near the target surface, and the processing part performs hovering processing as processing for hovering operation using the X-coordinate information and the Y-coordinate information of the object if the Z-coordinate range of the object from the target surface is detected to be a second Z-coordinate range farther than the first Z-coordinate range, and the processing part performs calibration processing on the first and second reflectance information when the object is in the first Z-coordinate range.

12. An optical detection system comprising:

a detection part that detects information of an object by receiving a light reflected by the object; and a processing part that performs first and second commands based on the information of the object, wherein the information of the object including first object information and second object information, the first object information is detected by the detection part when a first amount of the light is detected, and the second object information is detected by the detection part when a second amount of the light is detected, and the processing part performs the first command when the processing part acquires the first object information, and the processing part performs the second command when the processing part acquires the second object information, the processing part performs command processing of at least one of command determination and command execution using X-coordinate information and Y-coordinate information of the object if a Z-coordinate range of the object from a target surface is detected to be a first Z-coordinate range near the target surface, and the processing part performs hovering processing as processing for hovering operation using the X-coordinate information and the Y-coordinate information of the object if the Z-coordinate range of the object from the target surface is detected to be a second Z-coordinate range farther than the first Z-coordinate range, and the processing part performs calibration processing on the first and second reflectance information when the object is in the first Z-coordinate range.

* * * * *